Patented June 23, 1931

1,811,384

UNITED STATES PATENT OFFICE

WILLIAM J. COLLIER, OF NEW YORK, N. Y.

COMPOSITION FOR ARTIFICIAL PARTS FOR CORPSES

No Drawing. Application filed July 30, 1929. Serial No. 382,293.

The present invention relates to a composition of matter particularly adapted to the production of artificial parts for corpses, and to the artificial parts composed thereof.

The object of the present invention is to provide a composition for making artificial parts for corpses which would be free from the objectionable features of the materials hitherto used for this purpose.

In particular the object is to provide a composition for the purpose mentioned which would be plastic and readily workable, and which would set up to a strong, but not brittle structure, capable of being given a natural appearance.

Wax and plaster of Paris have been previously used for the purpose of making artificial parts for corpses, but both these materials suffer from decided disadvantages which are avoided by the composition of the present invention. Wax alone has the disadvantage that it lacks strength and is susceptible to temperature changes, while plaster of Paris is too brittle and does not lend itself readily to plastic molding or to the manipulation necessary to produce parts of a natural appearance.

The composition of the present invention consists essentially of zinc oxide or white lead, in major proportion, zinc oxide being preferred, and a polyhydroxy organic substance, of the general formula $$H_2COH-(CHOH)_n-R$$

wherein $n$ represents one of the integers 1 and 4, and R represents one of the groups

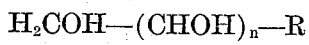

such as glucose or glycerol, together with various other materials which may be added in order to give the composition specific desired qualities, such as plaster of Paris, gypsum, alum, and borax to increase the strength and toughness of the mass, phenol or thymol to act as a preservative and disinfectant, and coloring matter added to the desired tint either in the mass or, as is preferable, applied to the surface. The phenol also has a bleaching action and if replaced by thymol, for instance, some other bleaching agent may be added.

As an example of a composition in accordance with the invention the following is given solely for purposes of illustration (the parts being by volume except as otherwise specified):

| | |
|---|---|
| Zinc oxide | about 50 parts |
| Glucose | about 10 parts |
| Plaster of Paris | about 3 parts |
| Alum | 2 tablespoons to 5 lbs. of material |
| Phenol | about 1 part |
| Borax | about 20–25 parts |

Coloring matter may be added to tint if desired.

This composition has been found to be particularly advantageous for the production of artificial parts for corpses such as eyelids, noses, ears, fingers, toes, hands, feet, cheeks, chins, lips, etc.

It will be apparent that the invention is not limited to the particular example given by way of illustration but broadly comprises a composition for the production of artificial parts for corpses comprising a major proportion of zinc oxide or white lead and a polyhydroxy organic substance of the type hereinbefore defined, and that artificial parts for corpses composed of the new composition are also comprised within the scope of the invention.

I claim:

1. A composition of matter for the production of artificial parts for corpses comprising in major proportion a white pigment of the group consisting of zinc oxide and white lead, and a polyhydroxy organic substance of the general formula $$H_2COH-(CHOH)_n-R,$$

wherein $n$ represents one of the integers 1 and 4, and R represents one of the groups

2. A composition of matter for the production of artificial parts for corpses comprising zinc oxide and glucose, the zinc oxide being present in major proportion.

3. A composition of matter for the production of artificial parts for corpses comprising zinc oxide, borax and glucose.

4. A composition of matter for the production of artificial parts for corpses comprising zinc oxide, about 50 parts, glucose, about 10 parts, borax about 20-25 parts, plaster of Paris, about 3 parts, phenol about 1 part, and alum, two tablespoons to 5 pounds of material.

5. Artificial parts for corpses comprising a major proportion a white pigment of the group consisting of zinc oxide and white lead, and a polyhydroxy organic substance of the general formula $$H_2COH-(CHOH)_n-R,$$

wherein $n$ represents one of the integers 1 and 4, and R represents one of the groups $$HCOH \text{ and } HCO$$
$$\phantom{HCOH}H$$

6. Artificial parts for corpses comprising zinc oxide and glucose, the zinc oxide being present in major proportion.

7. Artificial parts for corpses comprising zinc oxide, borax and glucose.

8. Artificial parts for corpses comprising zinc oxide, about 50 parts, glucose, about 10 parts, borax, about 20-25 parts, plaster of Paris, about 3 parts, phenol, about 1 part, and alum, two tablespoons to 5 pounds of material.

In testimony whereof, I affix my signature.

WILLIAM J. COLLIER.